(12) United States Patent
Gombar et al.

(10) Patent No.: US 11,015,337 B2
(45) Date of Patent: May 25, 2021

(54) METHOD OF POURING POLYISOCYANURATE FOAM DIRECTLY ONTO A FACER TO IMPROVE CELL ORIENTATION AND DENSITY STRATIFICATION

(71) Applicant: JOHNS MANVILLE, Denver, CO (US)

(72) Inventors: Richard Gombar, Englewood, CO (US); Carine Machaalani, Cornwall (CA); John M Dodi, St. Augustine, FL (US)

(73) Assignee: Johns Manville, Denver, CO (US)

( * ) Notice: Subject to any disclaimer, the term of this patent is extended or adjusted under 35 U.S.C. 154(b) by 144 days.

(21) Appl. No.: 15/935,841

(22) Filed: Mar. 26, 2018

(65) Prior Publication Data
US 2019/0292773 A1    Sep. 26, 2019

(51) Int. Cl.
| | |
|---|---|
| *E04B 1/80* | (2006.01) |
| *B32B 5/32* | (2006.01) |
| *B32B 5/18* | (2006.01) |
| *B32B 27/06* | (2006.01) |
| *B32B 27/40* | (2006.01) |

(52) U.S. Cl.
CPC .............. *E04B 1/806* (2013.01); *B32B 5/18* (2013.01); *B32B 5/32* (2013.01); *B32B 27/065* (2013.01); *B32B 27/40* (2013.01); *B32B 2250/03* (2013.01); *B32B 2250/40* (2013.01); *B32B 2266/0278* (2013.01); *B32B 2307/304* (2013.01); *B32B 2307/722* (2013.01); *B32B 2419/00* (2013.01)

(58) Field of Classification Search
CPC ....... E04B 1/806; B32B 27/40; B32B 27/065; B32B 5/18; B32B 5/32; B32B 2250/03; B32B 2419/00; B32B 2307/722; B32B 2266/0278; B32B 2250/40; B32B 2307/304
See application file for complete search history.

(56) References Cited

U.S. PATENT DOCUMENTS

| | | | | |
|---|---|---|---|---|
| 6,140,383 A | * | 10/2000 | Soukup | B29C 44/304 521/155 |
| 2014/0130435 A1 | * | 5/2014 | Paradis | E04D 5/10 52/309.12 |
| 2015/0354220 A1 | * | 12/2015 | Nandi | E04D 11/02 52/309.9 |

* cited by examiner

*Primary Examiner* — Brian Handville
(74) *Attorney, Agent, or Firm* — Robert D. Touslee (57) ABSTRACT

A method of forming a polyisocyanurate foam board includes providing a polyol and adding an isocyanate to the polyol to form a polyisocyanurate foam. A first inner surface of a first facer material is treated with a first flow of hydroxyl containing molecules. A second inner surface of a second facer material is treated with a second flow of hydroxyl containing molecules. The polyisocyanurate foam is coupled to the first treated inner surface and the second treated inner surface such that the polyisocyanurate is sandwiched between the first facer material and the second facer material, thereby exposing opposing outer surfaces of the polyisocyanurate foam to the hydroxyl containing molecules. A density of a medial portion of the polyisocyanurate foam is greater than a density of the polyisocyanurate at the opposing outer surfaces.

8 Claims, 6 Drawing Sheets

Dry_0007

FIG. 3A

Wet_0001

METHOD OF POURING POLYISOCYANURATE FOAM DIRECTLY ONTO A FACER TO IMPROVE CELL ORIENTATION AND DENSITY STRATIFICATION

BACKGROUND OF THE INVENTION

Polyisocyanurate foam (i.e., PIR board stock) has been widely used to insulate roofs and walls of commercial and industrial buildings for many decades due to its excellent thermal insulation, flame resistance, and mechanical properties. However, to achieved a desired insulation efficiency, it is necessary to manufacture PIR boards of certain thicknesses and densities. Due to the high costs of the chemical agents needed to produce the PIR foam, it is often very expensive to produce such insulation boards.

BRIEF SUMMARY OF THE INVENTION

Embodiments of the present invention provide PIR foam boards and method of producing PIR foam boards that maintain a desired core density, while requiring lesser quantities of chemicals and other materials for manufacture of the boards as compared to conventional techniques. This is achieved by applying a flow of hydroxyl containing molecules to facer material of the boards prior to the PIR foam being applied to the facer material. When contacted by the PIR foam, the hydroxyl containing molecules react with the PIR foam and cause a portion of the PIR foam to expand while a core of the PIR foam maintains its original density. This allows for reductions in the costs and chemical amounts needed to produce an effective PIR foam board.

In one aspect, a method of forming a polyisocyanurate foam board is provided. The method may include providing a polyol and adding an isocyanate and a catalyst to the polyol to form a polyisocyanurate foam. The method may also include treating a first inner surface of a first facer material with a first flow of hydroxyl containing molecules and treating a second inner surface of a second facer material with a second flow of hydroxyl containing molecules. The method may further include coupling the polyisocyanurate foam to the first treated inner surface and the second treated inner surface such that the polyisocyanurate is sandwiched between the first facer material and the second facer material, thereby exposing opposing outer surfaces of the polyisocyanurate foam to the hydroxyl containing molecules. A density of a medial portion of the polyisocyanurate foam may be greater than a density of the polyisocyanurate at the opposing outer surfaces.

In another aspect, a method of forming a polyisocyanurate foam board includes providing a polyol and adding an isocyanate and a catalyst to the polyol to form a polyisocyanurate foam. The method may also include treating an inner surface of at least one facer material with a flow of hydroxyl containing molecules and coupling the polyisocyanurate foam to the treated inner surface of the facer material. A density of the polyisocyanurate foam may be lowest at an interface formed between the treated inner surface and the polyisocyanurate foam.

In another aspect, a polyisocyanurate foam board is provided. The foam board may include a polyisocyanurate foam core having a medial portion and opposing outer surfaces. The polyisocyanurate foam core may be produced from an isocyanate and a polyol. The foam board may also include a facer material applied to at least one of the opposing outer surfaces of the polyisocyanurate foam core. A density of the medial portion of the polyisocyanurate foam core may be great than a density of the at least one of the opposing outer surfaces of the polyisocyanurate foam core.

BRIEF DESCRIPTION OF THE DRAWINGS

A further understanding of the nature and advantages of various embodiments may be realized by reference to the following figures.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The present invention is directed to polyisocyanurate (PIR) foam boards and methods for manufacturing PIR foam boards using lower quantities of chemicals and other materials while maintaining a desired insulation efficiently. Embodiments, of the invention achieve these benefits by pouring PIR foam directly onto a facer material that has been treated with a flow of hydroxyl containing molecules to improve cell orientation and density stratification. Specifically, the hydroxyl containing molecules react with the exposed outer surfaces of the PIR foam, causing the cells proximate the outer surface to expand while the core of the PIR foam remains unchanged. This expansion of the outer surfaces results in a thicker foam core, and therefore a thicker board, that still has a sufficiently dense core while using less material to form the foam core. Thus, the pour of PIR foam can be thinner than in a conventional process to produce a PIR foam board of the same thickness and insulation rating, thereby reducing materials and costs associated with making the PIR foam board. The expansion occurs in a direction generally aligned with a thickness of the PIR foam board, thereby changing an orientation of foam cells at the foam-facer interface.

Figure 1:
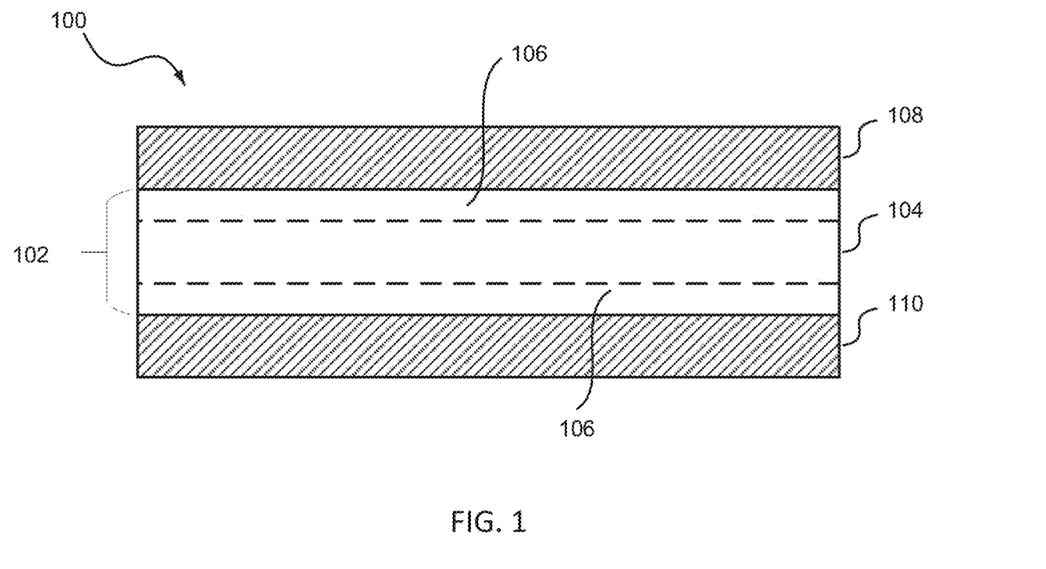
FIG. 1 depicts an embodiment of a PIR foam insulation board according to embodiments.

Turning now to FIG. 1, an embodiment of a PIR foam board 100 is shown. The foam board 100 may include a polyisocyanurate foam core 102. The polyisocyanurate foam core 102 may have a medial portion 104 and opposing outer surfaces or outer portions 106. The polyisocyanurate foam core 102 is coupled with a first facer material 108 adjacent one of the outer portions 106 and coupled with a second facer material 110 adjacent the other outer portion 106. In some embodiments, the medial portion 104 includes at least 50% of the thickness of the foam core 102, while in other embodiments up to about 85% of the foam core 102 may be formed of the medial portion 102, with the outer portions 106 making up the remaining thickness. A density of the medial portion 104 of the polyisocyanurate foam core 102 may be greater than a density of the opposing outer surfaces 106 of the polyisocyanurate foam core 102. For example, a density of the core remains between about 1.50 and 2.0 lb/ft$^3$, while a density of the outer portions 106 is reduced from about 10% overpack (1.65-2.20 lb/ft$^3$) to between −5% (1.42 lb/ft$^3$-1.9 lb/ft$^3$) to 9% (1.63 lb/ft$^3$ to 2.18 lb/ft$^3$) depending on water flow rate.

The medial portion 104 of the polyisocyanurate core 102 typically has an average foam cell size of less than about 200 microns, and more commonly between about 100-150. The average foam cell size of the outer portions 106 of the polyisocyanurate core 102 is typically between about roughly the same, although with a slight elongation. Additionally, the cells in the opposing outer portions 106 are elongated vertically (in a direction generally aligned with a width of the polyisocyanurate foam core 102) due to a release of gas from the reaction of a portion of the foam core 102 with hydroxyl groups the foam is exposed to during the manufacturing process.

The polyisocyanurate foam core 102 may be formed from a mixture of an isocyanate and a polyol. For example, polyfunctional isocyanates that may form substituted or unsubstituted polyisocyanates that are used to make the polyisocyanurate foam core 102 and other foam products include aromatic, aliphatic, and cycloaliphatic polyisocyanates having at least two isocyanate functional groups. Exemplary aromatic polyfunctional isocyanates include: 4,4'-diphenylmethane diisocyanate (MDI), polymeric MDI (PMDI), toluene disisocyanate, and allophanate modified isocyanate. For example, the polyfunctional isocyanate may be PMDI with functionality between 2.3 to 3.0, viscosity less at 800 cps at 25° C., and isocyanate content between 28% to 35%.

The polyfunctional isocyanates may be reacted with a polyfunctional co-reactant that has at least two reactive groups that react with the polyfunctional isocyanate to produce a polyisocyanurate compounds for the present products. Exemplary polyfunctional co-reactants may include polyester and polyether polyols having at least 2 isocyanate reactive groups, such as hydroxyl groups. Specific examples include aromatic polyester polyols which have good mechanical properties, as well as hydrolytic and thermo-oxidative stability. Commercially available polyester polyol include those sold by Stepan Company under the name Stepanol® and those sold by Huntsman Corporation under the name of Terol®. Exemplary polyols may have a functionality between 2 and 2.5 and hydroxyl number between 150 mg KOH/gm and 450 mg KOH/gm.

The catalysts used to polymerize the polyisocyanurates may include amine catalysts and metal catalysts, among other catalysts. The amine catalysts catalyze both urethane reactions between isocyanates and polyols, and urea reactions between water and isocyanates. The metal catalysts may include metal carboxylate trimer catalysts, which promote the conversion of isocyanate to highly thermally stable isocyanurate ring. Examples of suitable amine catalysts include pentamethyldiethylenetriamine (PMDETA), dimethylcyclohexylamine, and 1, 3, 5-tris(3-(dimethylamino) propyl)-hexahydro-triazine. Examples of suitable metal catalysts include potassium octoate and potassium acetate.

The present polyisocyanurate formulations may also include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, and Tergostab® series surfactants from Evonik, such as Tergostab® 8535.

The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

An isocyanurate is a trimeric reaction product of three isocyanates forming a six-membered ring. The ratio of the equivalence of NCO groups (provided by the isocyanate-containing compound or A-side) to isocyanate-reactive groups (provided by the isocyanate-containing compound or B side) may be referred to as the index or ISO index. When the NCO equivalence to the isocyanate-reactive group equivalence is equal, then the index is 1.00, which is referred to as an index of 100, and the mixture is said to be stoichiometrically equal. As the ratio of NCO equivalence to isocyanate-reactive groups equivalence increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages.

The polyisocyanurate core 102 has an isocyanate index greater than about 200, commonly between about 200 and 300, and more commonly between about 250 and 270. When isocyanate reacts with one or more polyols to form polyurethane, one NCO group reacts with one OH group. As is known in the art, the index is defined as the ratio of NCO group to OH group multiplied by 100 as shown in the formula below:

$$\text{Index} = \frac{\text{Moles of NCO group}}{\text{Moles of OH group}} \times 100$$

When the number or NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 250 and 270, provides at least a 2:1 ratio of NCO groups to OH groups, which has been found to provide an appreciable combination of structure integrity, thermal strength and/or stability, and fire resistance. In some embodiments, the isocyanate index may be between 250-300.

In some embodiments, the polyisocyanurate core 102 may include between 1 and 10 weight percent of a hydrocarbon blowing agent, such as n-pentane, iso-pentane, cyclopentane, and their blends. In an exemplary embodiment, the polyisocyanurate core 102 may include between 5 and 8 weight percent of the hydrocarbon blowing agent. The weight percent of the hydrocarbon blowing agent typically corresponds with the foam density of the polyisocyanurate core 102 with lower density foam boards (e.g., insulation boards) having a higher weight percentage of the hydrocarbon blowing agent than more dense foam boards (e.g., roofing cover boards). For example, insulation boards having a density of between about 1.5 and 2.5 pounds per cubic foot ($lbs/ft^3$), commonly have 5% or more of a hydrocarbon blowing agent by weight, and more commonly between about 6 and 7 weight percent. In contrast, roofing cover boards that have a density of up to 10 $lbs/ft^3$, and more commonly between 6 and 7 $lbs/ft^3$, commonly have less than 5% of a hydrocarbon blowing agent by weight, and more commonly between about 1.5 and 3 weight percent.

In some embodiments, the foam core 102 may include other substances. As illustrated below, Table 1 details the substances that form part of the foam core 102 and their ranges in percent by weight of the overall foam core 102.

TABLE 1

| Substance | Min. Percent by Weight | Max. Percent by Weight |
| --- | --- | --- |
| Polyol | 5% | 45% |
| Viscosity Modifier | 0% | 10% |
| Surfactant | 0% | 2% |
| Amine Catalyst | 0% | 0.5% |
| Potassium Octoate | 0% | 2% |
| Potassium Acetate | 0% | 0.5% |
| Filler(s) | 0% | 50% |
| Water | 0% | 0.5% |
| Pentane | 1% | 4% |
| Isocyanate | 25% | 75% |

Foam board 100 also includes a first facer material 108 and a second facer material 110 that are applied to opposing outer major surfaces 106 of the polyisocyanurate core 102. The facer material 104 typically includes a glass fiber mat, but may include other types of facer materials. The facer materials 108, 110 are typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facers 108, 110 may include a mineral and/or pigment based coating with high solid content to provide one or more desired characteristics, such as low porosity, fire retardancy, mechanical strength, and the like. The facers 108, 110 may have a thickness of between about 0.3 and 1.2 mm.

During the manufacture of the PIR foam board 100, each facer 108, 110 may be treated with a flow of liquid containing hydroxyl groups immediately prior to being exposed to the polyisocyanurate foam. The liquid containing hydroxyl groups (such as water, diethyl glycol, or propylene glycol) contacts an outer surface of the polyisocyanurate foam and reacts with materials within the foam, such as isocyanates like MDI. This reaction triggers a release of gas, such as $CO_2$, which causes the foam cells near the foam-facer interface to expand in a generally vertical direction while foam cells in the middle of the foam core 102 remain unchanged. This results in a decrease of density in the foam cells near the foam-facer interface.

The facers 108, 110 may be substantially coextensive with, coextensive with, or extend beyond the major surface of the foam core 102 to which each facers 108, 110 is bonded along the length(s) of any one, two, or three edges of the foam core 102 or along the lengths of all four edges of the foam core to overlap and be bonded to other roofing cover board composites.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facers 108, 110 may have a thickness of between about 0.4 and 1.2 mm. Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facers 108 may have a thickness of between about 0.006 and 1.2 mm. The thickness of 0.006 mm typically represents the thickness of a metal facer while the 1.2 mm represents the thickness of other facers. The facers 108, 110 may be similar or different, may have a different thickness, and/or may have a different material coating as desired.

The polyisocyanurate foam board 100 may have an initial R-value of at least 6.40, and commonly between 6.5 and 6.55. This initial R-value is higher than that initially exhibited by conventional polyisocyanurate foam boards. For example, conventional foam boards typically have an initial R-value of about 6.3 and not normally greater than 6.4. As such, the polyisocyanurate foam board composition of the embodiments described herein provide an initial R-value increase of approximately 0.01 to 0.15. The increase in R-value of the polyisocyanurate foam boards described herein may be achieved through a nucleation effect that results in smaller cell size in the foam as described above.

Figure 2:
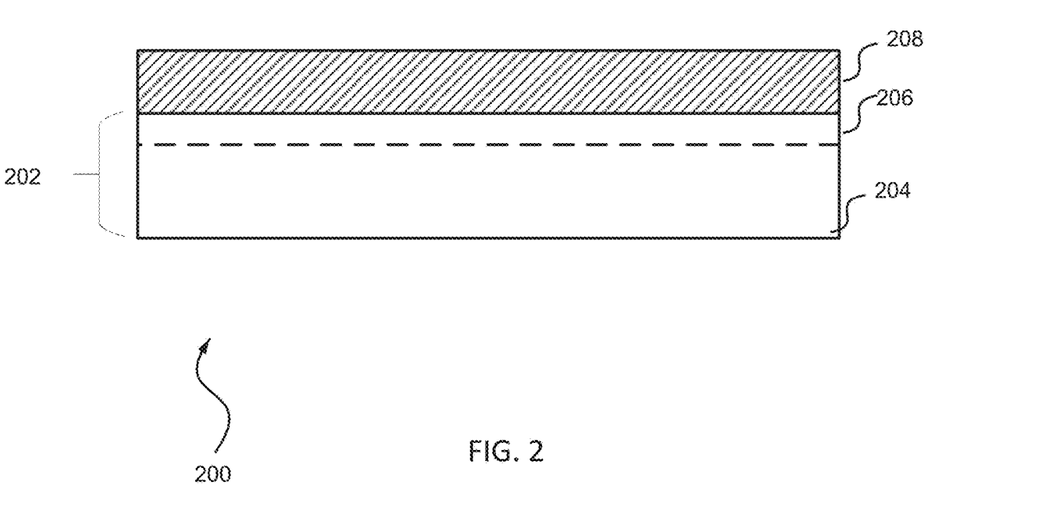
FIG. 2 depicts an embodiment of a PIR foam insulation board according to embodiments.

FIG. 2 depicts a PIR foam board 200. PIR foam board 200 may be similar to foam board 100, but may have a facer material 208 coupled to only a single outer portion 206 of the foam core 202. Foam core 202 may be formed of a polyol and an isocyanate as described in relation to FIG. 1. Here, since only one outer surface 208 of the foam core 202 is exposed to a facer material 208 that has been pre-treated with a flow of hydroxyl containing molecules, only the foam at that outer surface 206 (at the interface between foam and the hydroxyl-treated facer material 208) reacts and expands. As a result, the foam core 202 and non-faced outer surface 208 have the original small cellular structure and higher density, while the faced outer surface 208 has a lower density with larger cellular sizes. Here, the medial portion 204 may extend all the way to the edge of the foam core 202 opposite the facer 208. The medial portion 204 may include between about 75-90% of the thickness of the foam core 202.

Figure 3A:
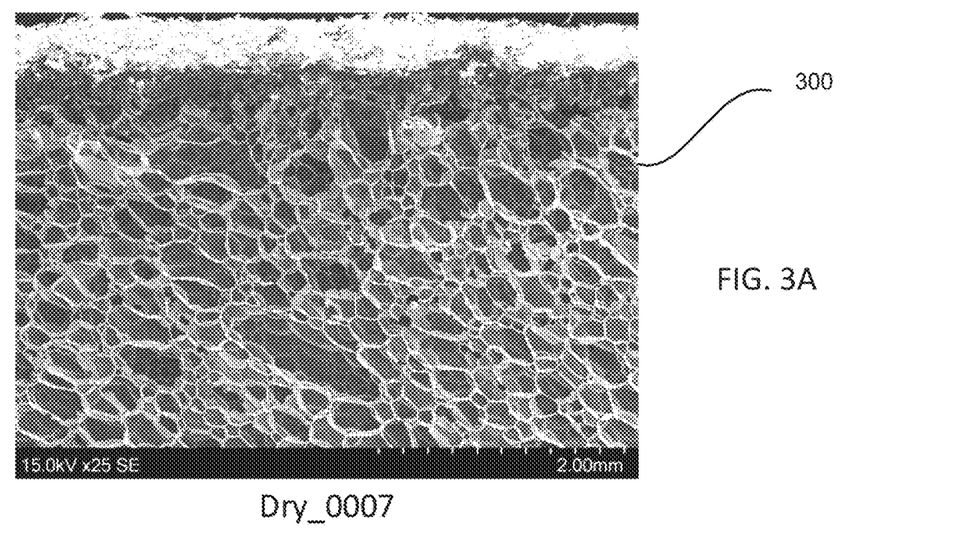
FIG. 3A is a microscopy image showing the cellular structure of a conventional PIR foam board.
Figure 3B:
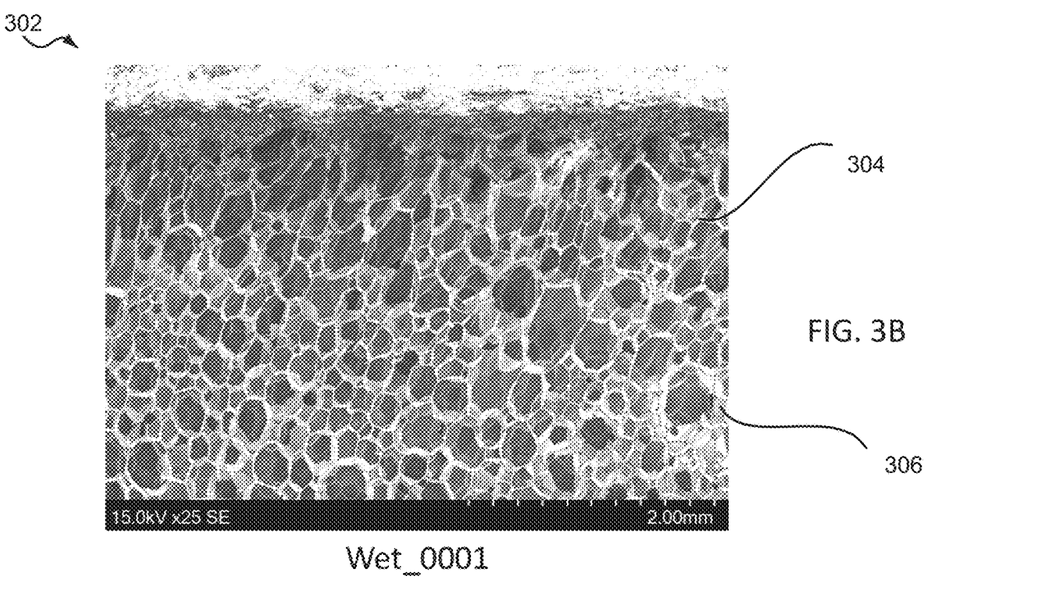
FIG. 3B is a microscopy image showing the cellular structure of an improved PIR foam board according to embodiments.

FIG. 3A depicts a microscopy image of a conventional PIR foam core 300. Here, the PIR foam core 300 has not been exposed to a facer material that has been pre-treated with a flow of hydroxyl containing molecules, resulting in a foam core 300 that has a fairly consistent cell density throughout. FIG. 3B depicts a microscopy image of an improved PIR foam core 302 according to the invention. Here, the PIR foam core 302 has been exposed to a facer material that has been pre-treated with a flow of hydroxyl containing molecules. The reaction between the hydroxyl containing molecules and the outer portion 304 of the core 302 has caused a release of gas, such as $CO_2$, that expands the cells of the foam core 302 at the outer portion 304, while leaving the cellular structure of the unexposed foam in the medial portion 306 of the foam core 302 unchanged, and therefore, more dense. Additionally, the expansion elongates the cells at the outer portion in a direction generally aligned with the foam thickness, thereby changing an orientation of the cells to be vertical rather than horizontal.

Figure 4:
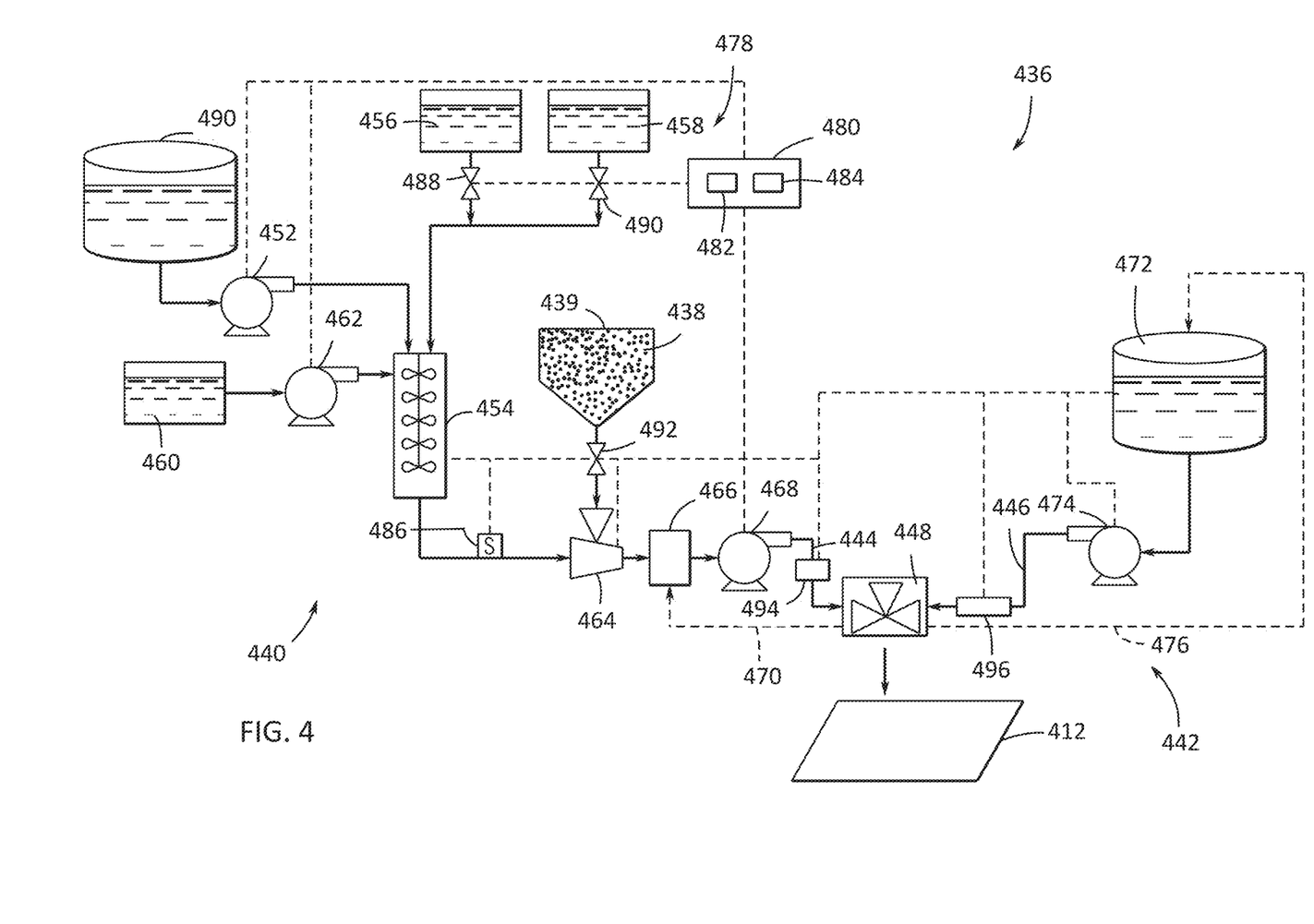
FIG. 4 is a flowchart depicting a process for forming a PIR foam according to embodiments.

FIG. 4 is a schematic view of an embodiment of a PIR foam manufacturing system 436 that makes a PIR foam 412, such as that used to make foam core 102. As will be explained below, the manufacturing system 436 may include a first chemical line 440 and a second chemical line 442. The first chemical line 440 forms a first mixture 444 and the second chemical line 442 forms and/or carries a second chemical mixture 446 to a mixing head 448. At the mixing head 448, the manufacturing system 436 combines the first and second chemical mixtures 444, 446, enabling the first and second mixtures 444, 446 to chemically react and form the foam layer 412. For example, the first chemical line 440 includes an isocyanate-reactive compound such as a polyol. In accordance with the present invention, a threshold amount of water is included within the first chemical line 440. The order in which ingredients are added to the first chemical line 440 can be varied. The timing of the addition of the water can also be varied. For example, in some embodiments, water is combined with the polyol, optionally with one or more other ingredients such as surfactants, catalysts, and/or additives.

In some embodiments, water is introduced to the first chemical line 440 by using an in-line continuous mixer at a pressure of less than 3,400 kPa. In other embodiments, the water and the polyol are mixed at pressure of a less than 3,400 kPa to dissolve or emulsify the polyol and water within the B-side stream. In some embodiments, the water is introduced to the first chemical line 440 (i.e., combined with the polyol) prior to introducing the blowing agent.

The first chemical line 440 forms the first mixture 444, by pumping polyol 450 from a storage tank or polyol source 451 with a pump 452 into a mixer 454 (e.g., dynamic mixer). In the mixer the polyol 450 may be combined with one or more catalysts 456 (e.g., potassium octoate, potassium acetate, amine, surfactants, etc.) from a catalyst source 457. In some embodiments, additives and/or fillers may be added. For example, the polyol may be combined with a reactive viscosity additive 458 (e.g., propylene glycol, diethylene glycol, polypropylene glycol, propylene carbonate) from a viscosity additive source 459 that reduces the viscosity of the first mixture 444. In some embodiments, a filler 438 may be added to the first mixture 444 to increase the viscosity. By including the viscosity additive 458 the manufacturing system 436 is able to maintain a desired viscosity of the first mixture 444 with the added filler 438. The use of fillers (and resultant use of viscosity reduction additives) may be useful to further reduce the costs of producing the PIR foam boards, while maintaining sufficient material to produce a high density foam core 102. The fillers may include inorganic, organic powders, platelets, fibers, granules, or a combination thereof with particle sizes less than one hundred and fifty microns. In some embodiments, the particle size may be less than ten microns, which may facilitate mixing of the filler in the foam layer(s) 412 as well as homogeneity. Examples of fillers may include talc, kaolin, glass dust, mica, carbon black, magnesium hydroxide, gypsum, calcium carbonate, expanded perlite, glass fibers, or a combination thereof. In some embodiments, the viscosity additive 458 (e.g., propylene glycol, diethylene glycol, polypropylene glycol, etc.) may be selected to increase adhesion between the foam core 102 and any additional layers (e.g., facer materials 108, 110). In other words, the viscosity additive 458 may compensate for a possible reduction in adhesion between the foam core 102 and additional layers (e.g., facer materials 108, 110) when filler 438 is added to the foam core 102.

As the polyol 450, catalysts 456, and any optional viscosity additive 458 and/or filler 438 mix in the mixer 454, a blowing agent 460 (such as an alkane blowing agent like a pentane) from a blowing agent source 461 may be pumped into the mixer 454 with a pump 462. For example, the blowing agent 460 may be water mixed with pentane. During the chemical reaction between the first mixture 444 and the second mixture 446 the blowing agent 460 evaporates forming bubbles in the foam layer 412, which increases the insulative properties of the foam layer 412.

In some embodiments, the amount of alkane blowing agent (e.g., pentanes) used in the manufacture of polyisocyanurate foam is between about 12 and 40 parts by weight alkane blowing agent per 100 parts by weight of polyol, more commonly between about 18 and 33 parts by weight alkane blowing agent per 100 parts by weight of polyol.

Optionally, after exiting the mixer 454, the polyol 450, catalysts 456, any additives and/or blowing agent 460 enter a mixer 464 (e.g., solid-liquid mixer, eductor mixer) where filler 438 is added. As the filler 438 combines with the polyol 450, catalysts 456, viscosity additive 458, and blowing agent 460, the filler 438 increases the viscosity of the first mixture 444, which compensates for the previously added viscosity additive 458. In some embodiments, the filler 438 may be talc, kaolin, glass dust, mica, carbon black, magnesium hydroxide, gypsum, calcium carbonate, expanded perlite, glass fibers, or a combination thereof.

The first mixture 444 may then enter a tank 466 (e.g., a surge tank) that compensates for variations in the production process. For example, the manufacturing system 436 may include a return line 470 that redirects excess amounts of the first mixture 444 from the mixing head 448 to the tank 466 (e.g., during shutdown of the manufacturing system 436). From the tank 466, the first mixture 444 is pumped with a pump 468 to the mixing head 448. As the pump 468 pumps the first mixture 444 into the mixing head 448, the second chemical line 442 pumps a second mixture 446 (e.g., isocyanate 473) into the mixing head 448 using the pump 474. The first and second mixtures 444, 446 are then combined and discharged from the mixing head 448 to form the foam layer 412. In some embodiments, mixing head 448 is an impingement mix head. In particular embodiments, mixing takes place at a temperature of from about 5 to about 45° C. In some embodiments, mixing takes place at a pressure in excess of 2,000 psi. As explained above, when the first and second mixtures 444 and 446 combine they chemically react to form the foam 412 (e.g., polyurethane, polyisocyanurate, and one or more fillers). The mixture can then be deposited onto one or more facers 108, 110 or other layers to form an insulation board 100.

As described elsewhere herein, the facer may be treated with a solution containing hydroxyl groups immediately prior to exposure to the polyisocyanurate foam 412. The hydroxyl groups react with the outer portions of the foam 412, causing the discharge of gas that results in the elongation and re-orientation of the cellular structure of the foam 412 near the foam-facer interface. The board 100 may be positioned within and carried by a laminator. While in the laminator, the reaction mixture rises and can be married to a second facer to form a composite, which may also be referred to as a laminate, wherein the foam is sandwiched between upper and lower facers. The composite, while in laminator, or after removal from laminator, is exposed to heat that may be supplied by, for example, oven. For example, laminator may include an oven or hot air source that heats the slats and side plates of the laminator and there through transfers heat to the laminate (i.e., to the reaction mixture). Once subjected to this heat, the composite (i.e., the reaction mixture), or a portion of the composite (i.e., reaction mixture) can undergo conventional finishing within a finishing station, which may include, but is not limited to, trimming and cutting.

It will be appreciated that while discussed with the additives, blowing agents, and/or fillers being present in the first stream (with the polyol), in some embodiments, one or more of the additional components may be included in the second stream. Additionally, it will be noted that the presence and/or quantities of any additives, fillers, and the like may be based upon the intended application of the final foam board product. In some embodiments, the manufacturing system 436 may include a return line 476 that returns excess second mixture 446 to the storage tank or isocyanate source 472 (e.g., during shutdown).

In order to control the manufacturing system 436, the manufacturing system 436 may include a control system 478. The control system 478 includes a controller 480 with one or more processors 482 that execute instructions stored on one or more memories 484 to control various components (e.g., pumps, mixers, valves, etc.) that form part of the first and second chemical lines 440, 442 using feedback from sensors and/or flowmeters.

For example, the manufacturing system 436 may include one or sensors 486 that monitor the mixing of the polyol 450, catalysts 456, viscosity additive 458, and blowing agent 460 and/or whether the polyol 450, catalysts 456, viscosity additive 458, and blowing agent 460 are within threshold ratios. If the proportions of polyol 450 and/or blowing agent 460 are outside of a threshold range, the controller 480 executes instructions with the processor 482 to increase and/or decrease the flow of the blowing agent 460 and/or polyol 450 using the pumps 452 and 462. Likewise, if the amounts of the catalysts 456 and/or viscosity additive 458 are outside of a threshold range, the controller 480 may execute instructions to control valves 488 and/or 490 to increase and/or decrease the amount of catalysts 456 and/or viscosity additive 458 entering the mixer 454.

Based on the measured amounts of polyol 450, catalysts 456, viscosity additive 458, and blowing agent 460, the controller 480 may control the amount of filler 438 that enters the mixer 464. For example, the controller 480 may control a valve 492 to increase and decrease the amount of filler 438 that enters the mixer 464. In some embodiments, the control system 478 may include a level sensor that detects the percentages of liquid and filler in the first mixture 444 to ensure the desired ratio of polyol 450, catalysts 456, viscosity additive 458 to filler 438 in the first mixture 444.

In order to control the ratio of the first mixture 444 to the second mixture 446 in the mixing head 448, the control system 478 may include flow meters 494, 496. As illustrated, the flow meter 494 enables measurement of the first mixture 444 entering the mixing head 448 and the flow meter 496 enables measurement of the second mixture 446 entering the mixing head 448. In operation, the controller 480 communicates with the flow meters 494, 496 and controls the pumps 468 and 474 in response to measured flow rates to ensure that the ratio of the first and second mixtures 444, 446 mix in the mixing head 448 within threshold ratios. In some embodiments, the concentration of the isocyanate-containing compound to the isocyanate-reactive compounds (polyol) within the respective chemical lines 440, 442 is adjusted to provide the foam product with an ISO index of between about 200-300.

It will be appreciated that other foam forming systems may be used to produce the PIR foam used in the foam boards of the present application. For example, additional systems are disclosed in U.S. Patent Publication No. 2017/0321028, filed on May 9, 2016, the entire contents of which is hereby incorporated by reference.

Figure 5:
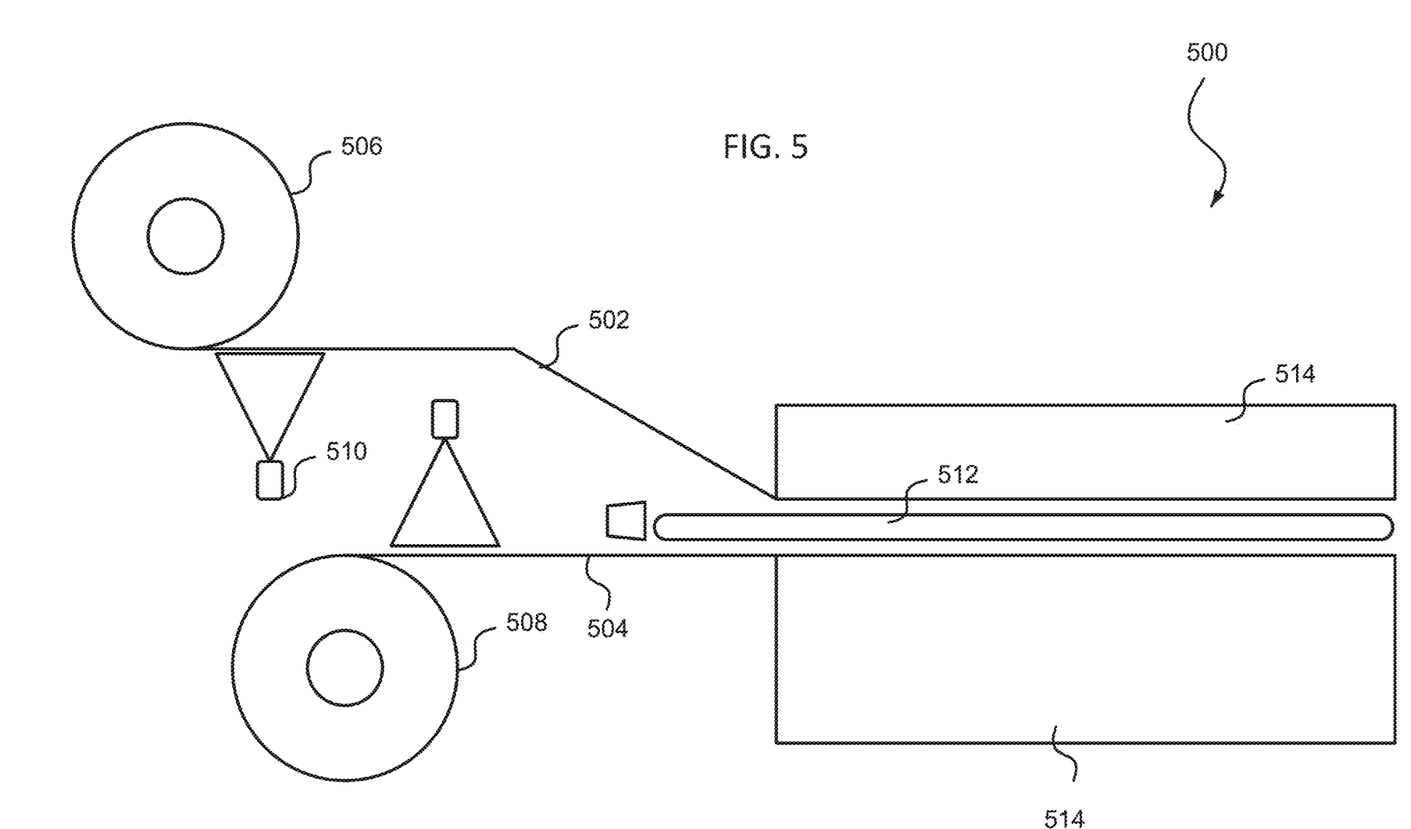
FIG. 5 is a flowchart showing a portion of the process for forming a PIR foam board according to embodiments.

FIG. 5 depicts a schematic of a system 500 for producing PIR foam boards. System 500 may use the foam produced by system 400. Oftentimes, systems 400 and 500 are combined into a single assembly that not only produces the foam, but also uses the foam to produce foam boards, such as boards 100 and 200. System 500 includes a top facer material 502 and a bottom facer material 504. The facer materials 502, 504 may be unrolled from one or more facer rolls 506 and 508, respectively. As the facer materials 502, 504 are unrolled, a flow of hydroxyl containing molecules may be applied to an inner surface of each of the facer materials 502, 504. For example, one or more sprayers 510, such as pulsating electric sprayers, may be used to apply the flow of hydroxyl containing molecules to the facer materials 502, 504. Other sprayers or applicators may be used to apply the flow of hydroxyl containing molecules to the facer materials 502, 504. It will be appreciated that it may be preferable to use application techniques other than atomization to apply the flow, as atomization produces liquid particles that are too small and may allow the hydroxyl containing molecules to be absorbed and/or evaporated too quickly and may not provide sufficient exposure of the PIR foam to the hydroxyl flow. In some embodiments, the flow may be applied to the facer materials 502, 504 at rates between about 0.01 gal/min and about 1.0 gal/min, with flow rates between about 0.2 gal/min and 0.6 gal/min being more common to prevent oversaturation of the facer materials 502, 504, which may cause significant changes in the insulation properties of the PIR foam board. The flow of hydroxyl containing molecules may include any hydroxyls, such as water diethylene glycol, or propylene glycol. In some embodiments, facing material 502, 504 may be exposed to facer heaters prior to coming into contact with a PIR foam.

After the hydroxyl containing molecules are applied to facers 502, 504, a PIR foam 512, such as the foam 12 produced by system 400, may be applied to the treated sides of the facers 502, 504. For example, the foam 512 may be poured onto a bottom one of the facers 502, 504 and a top one of the facers 502, 504 may be positioned atop the foam such that the foam forms a foam core sandwiched between the two facers 502, 504. This brings the hydroxyl containing molecules in contact with the outer major surfaces of the foam core. The hydroxyls then react with the PIR foam, causing the foam near the outer surfaces to expand in a direction generally aligned with the thickness of the foam core. As just one example, the PIR foam may include MDI, which may be the most abundant material in the foam. The MDI is a very reactive species that may react with most or all hydroxyls. Upon reacting with a hydroxyl, such as water, the MDI releases $CO_2$, which causes cells within the outer portions of the foam (near the interface between the hydroxyls and the foam) to expand while cellular structure of the medial portion of the foam remains unchanged. This results in a foam core that is more dense in the medial portions and less dense at the outer portions near the facers 502, 504. For example, the density of the medial portion may be between about 1.5-2.0 lbs/ft³ while the overpack of the outer portions may be between about between −5% (1.42 lb/ft³-1.9 lb/ft³) to 9% (1.63 lb/ft³ to 2.18 lb/ft³) depending on water flow rate. As long as the medial portion of the core remains sufficiently dense, the foam core and resulting foam board may still have the insulation properties of a conventional uniform-density PIR foam board of the same thickness. For example, the resulting polyisocyanurate foam board may have an R-value of between about 6.4 and 6.55.

Upon coupling the facers 502, 504 with the foam, the foam and facers 502, 504 may be inserted into a laminating device 514 that uses heat and/or pressure to adhere the layers together to form a foam insulation board. Once subjected to this heat, the foam board can undergo conventional finishing within a finishing station, which may include, but is not limited to, trimming and cutting.

Figure 6:
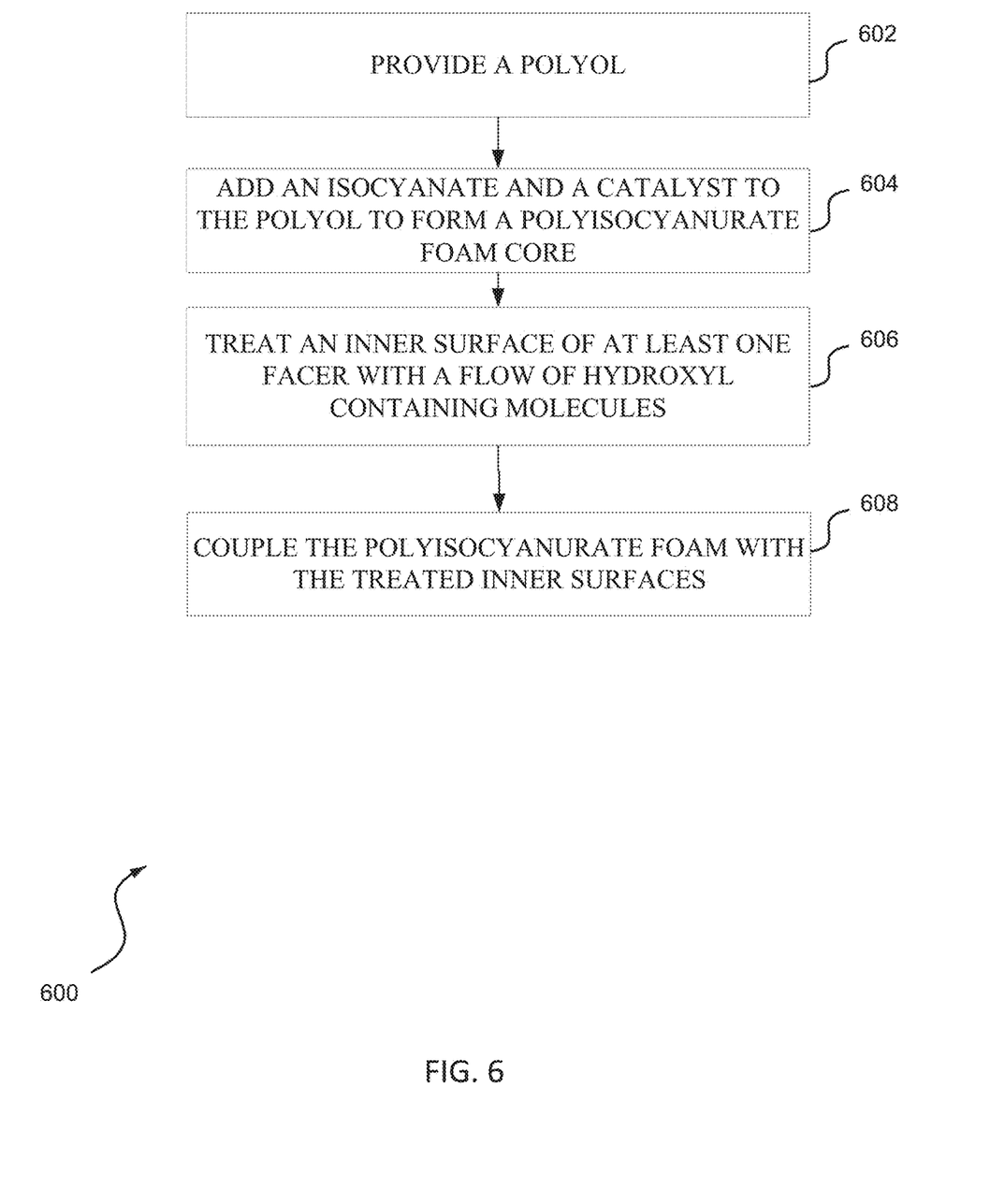
FIG. 6 is a flowchart depicting a process for forming a PIR foam board according to embodiments.

Referring now to FIG. 6, illustrated is a process 600 of forming a polyisocyanurate foam board. Process 600 may be used to form any of the foam boards described herein, and may involve the use of board fabrication systems such as those described in relation to FIGS. 4 and 5. At block 602, a polyol is provided. Suitable polyols include polyfunctional co-reactants that have at least two reactive groups that react with the polyfunctional isocyanate to produce a polyisocyanurate compounds for the present products. Exemplary polyfunctional co-reactants may include polyester and polyether polyols having at least 2 isocyanate reactive groups, such as hydroxyl groups. Specific examples include aromatic polyester polyols which have good mechanical properties, as well as hydrolytic and thermo-oxidative stability. Commercially available polyester polyol include those sold by Stepan Company under the name Stepanol® and those sold by Huntsman Corporation under the name of Terol®. Exemplary polyols may have a functionality between 2 and 2.5 and hydroxyl number between 150 mg KOH/gm and 450 mg KOH/gm.

At block 604, an isocyanate and a catalyst are added to the polyol to form a polyisocyanurate core having an isocyanate index greater than about 200. Suitable isocyanates may include polyfunctional isocyanates that may form substituted or unsubstituted polyisocyanates that are used to make the polyisocyanurate foam core 102 and other foam products include aromatic, aliphatic, and cycloaliphatic polyisocyanates having at least two isocyanate functional groups. Exemplary aromatic polyfunctional isocyanates include: 4,4'-diphenylmethane diisocyanate (MDI), polymeric MDI (PMDI), toluene disisocyanate, and allophanate modified isocyanate. For example, the polyfunctional isocyanate may be PMDI with functionality between 2.3 to 3.0, viscosity less at 800 cps at 25° C., and isocyanate content between 28% to 35%. At block 606, an inner surface of one or more facers may be treated with a flow of hydroxyl containing molecules. For example, a hydroxyl may be sprayed or otherwise applied to an inner surface of the facers at a rate of between about 0.01 and 1.0 gal/min, more typically less than about 0.6 gal/min. At block 608, the polyisocyanurate foam is coupled to the treated surface of each facer material. In embodiments with two facers, the polyisocyanurate foam is sandwiched between the two facers such that the outer major surfaces of the foam are exposed to the hydroxyl containing molecules on the treated surfaces of the facers. As described herein, the hydroxyls react with the polyisocyanurate foam (such as with a component of the foam like MDI) and generate a gas, such as $CO_2$. This causes the portion of the foam near the interface to expand, thereby increasing a cellular size and lowering the density of the foam at the interface. The medial portion of the foam core remains unchanged such that a density of a medial portion of the polyisocyanurate foam is greater than a density of the polyisocyanurate at the opposing outer surfaces. In some embodiments, the process 600 may further include laminating the foam core to the facer(s) and/or cutting the foam board.

Figure 7:
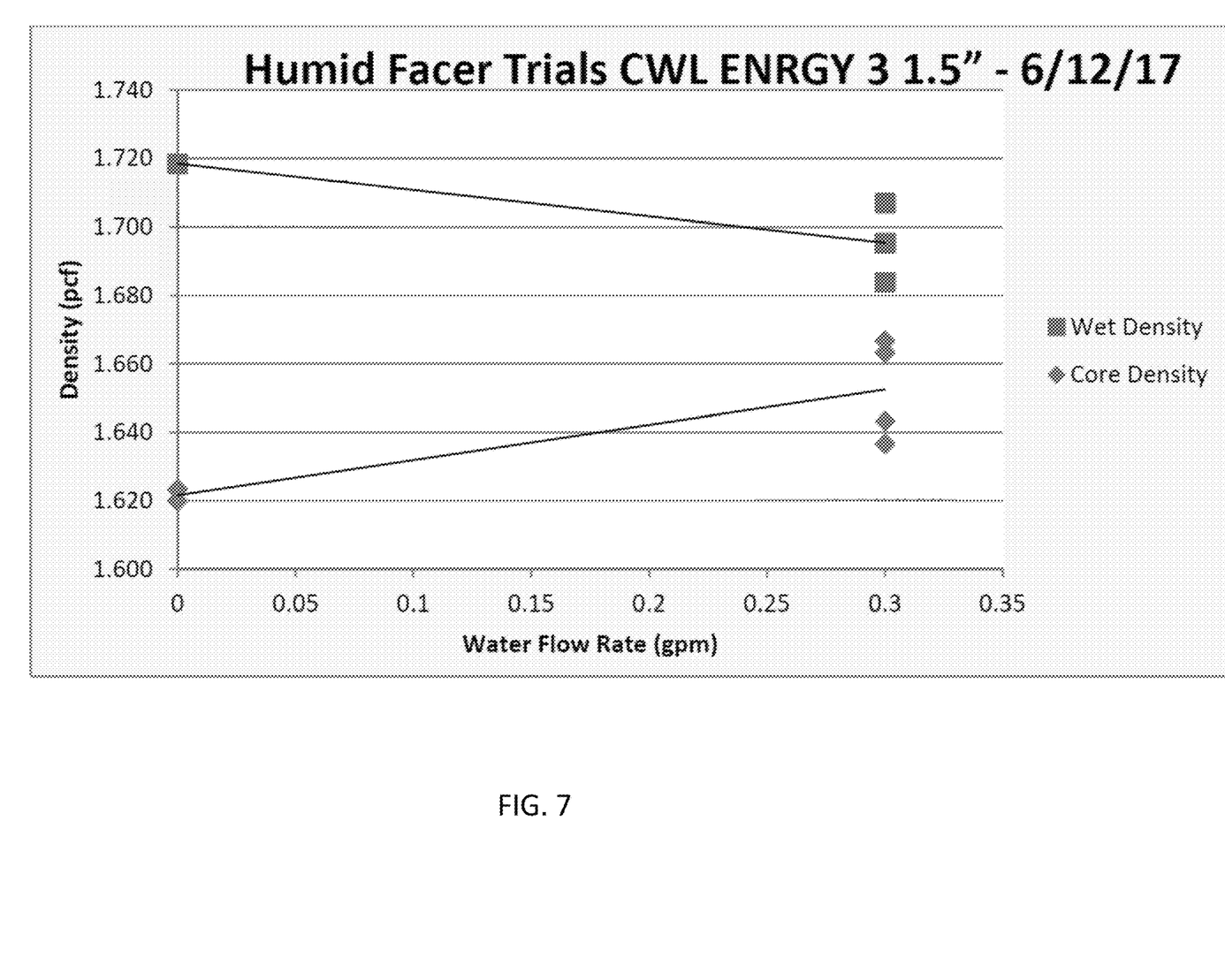
FIG. 7 is a graph showing densities of a PIR foam board according to embodiments.

FIG. 7 is a chart showing the wet density and core density for various hydroxyl (water) flow rates. As shown here, the wet density relates to an amount of raw materials that go into making a polyisocyanurate board of a desired size that has the desired insulation properties. The core density relates to the actual density of the foam core (or the medial portion of the foam core). As flow rates of a hydroxyl group, such as water, are increased, the two densities begin diverging, where a ratio of 1:1 while maintaining a minimum core density of at least 1.50 lb/ft³ results in a perfectly efficient use of raw materials. The reduction of wet density as hydroxyl flow increases demonstrates that the application of a hydroxyl provides the necessary core density and reduces the amount of raw materials needed to produce a foam board that meets the necessary insulation requirements. This general relationship holds until a flow rate of approximately 0.6 gal/min, where the physical and insulation properties of the board begin to change.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A polyisocyanurate foam board comprising:
a polyisocyanurate foam core having a medial portion and opposing outer surfaces, wherein the polyisocyanurate foam core is a monolithic piece of foam, the polyisocyanurate foam core produced from:
an isocyanate;
a polyol; and
a facer material applied to at least one of the opposing outer surfaces of the polyisocyanurate foam core, wherein a density of the medial portion of the polyisocyanurate foam core is greater than a density of the at least one of the opposing outer surfaces of the polyisocyanurate foam core.

2. The polyisocyanurate foam board of claim 1, wherein: the isocyanate comprises methylene diphenyl diisocyanate.

3. The polyisocyanurate foam board of claim 1, wherein: the density of the medial portion of the polyisocyanurate foam core is between about 1.58 and 1.95 lbs/ft$^3$.

4. The polyisocyanurate foam board of claim 1, wherein: the medial portion of the polyisocyanurate foam core comprises an average foam cell size of less than 200 microns.

5. The polyisocyanurate foam board of claim 1, wherein: the polyisocyanurate foam core further comprises a fire retardant.

6. The polyisocyanurate foam board of claim 1, wherein: the density of the at least one of the opposing outer surfaces is between about 1.43 lbs/ft$^3$ and 2.18 lbs/ft$^3$.

7. The polyisocyanurate foam board of claim 1, wherein: the foam core comprises a continuous cellular structure that includes the medial portion and the opposing outer surfaces.

8. A polyisocyanurate foam board comprising:
a polyisocyanurate foam core having a medial portion and opposing outer surfaces, wherein the polyisocyanurate foam core is a monolithic piece of foam, the polyisocyanurate foam core produced from:
an isocyanate;
a polyol; and
a facer material applied to at least one of the opposing outer surfaces of the polyisocyanurate foam core, wherein a density of the polyisocyanurate foam core varies over a thickness of the polyisocyanurate foam core such that the density of the polyisocyanurate foam core is greatest in the medial portion.

* * * * *